March 18, 1930.  R. H. GILLESPIE  1,751,456
LIQUID RESERVE TANK
Filed Dec. 8, 1927   2 Sheets-Sheet 1

Inventor:
Robert H. Gillespie,
By Sturtevant & Mason,
Att'ys.

March 18, 1930.  R. H. GILLESPIE  1,751,456
LIQUID RESERVE TANK
Filed Dec. 8, 1927  2 Sheets-Sheet 2
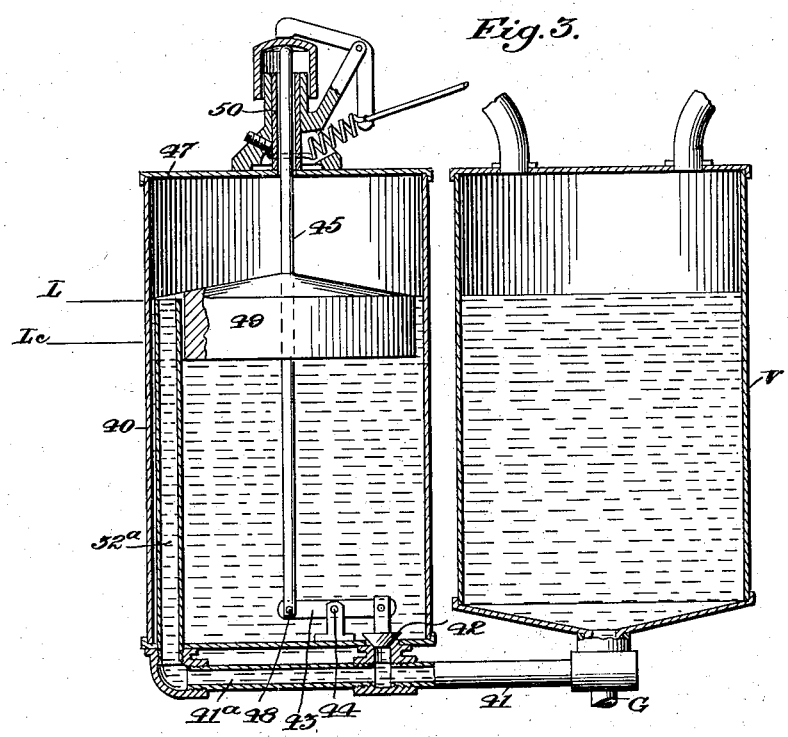
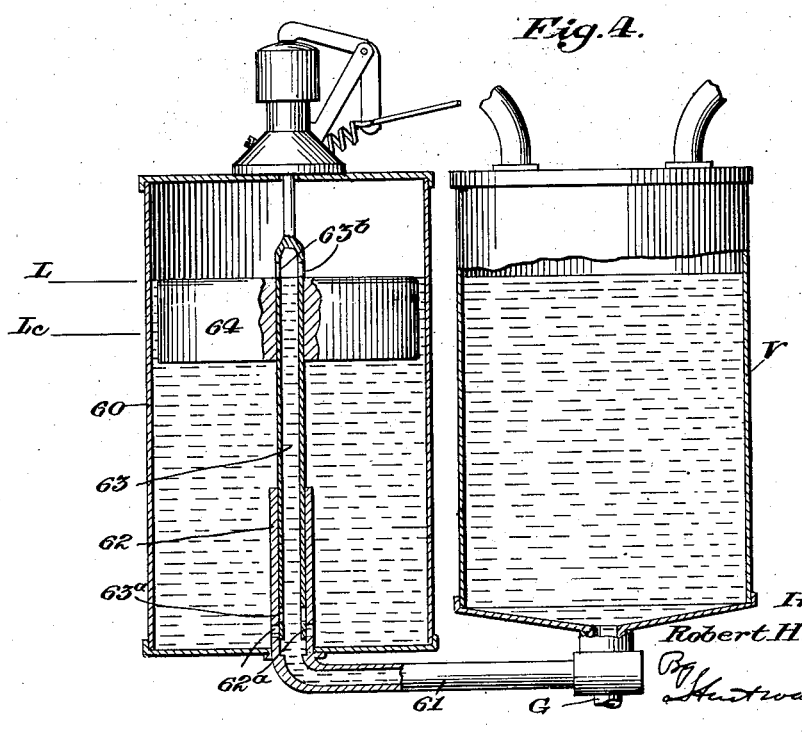
Inventor:
Robert H. Gillespie, Patented Mar. 18, 1930

1,751,456

UNITED STATES PATENT OFFICE

ROBERT H. GILLESPIE, OF LITTLE ROCK, ARKANSAS, ASSIGNOR TO MID-WEST SPECIALTY COMPANY, OF LITTLE ROCK, ARKANSAS

LIQUID-RESERVE TANK

Application filed December 8, 1927. Serial No. 238,607.

This invention relates to liquid reserve tanks, more particularly for automobiles, by means of which a reserve of fuel is maintained for emergency use.

Many devices have heretofore been proposed for withdrawing and preserving a quantity of fuel apart from the main supply, so that upon total failure of the main supply it is possible to utilize this reserve for emergency relief and travel to a filling station. The present invention proposes a device which is automatic in its operation, and which when empty will refill itself without manual attention, and thus automatically place itself in a condition for further emergency use.

One of the objects of this invention is therefore to provide a reserve tank structure which operates automatically to withdraw an emergency supply of fuel from a fuel supply and to store it for withdrawal at the election and upon a manual operation by the driver.

Another object of the invention is to provide a reserve tank which is operated for emergency delivery by a simple and momentary manipulation by the driver and thereafter continues in condition to deliver its reserve supply until the main supply is again recharged.

A further object of the invention is to provide a system of this type which is very simple in structure and has few moving parts, and hence is easy of manufacture and maintenance.

With these and other objects in view as will appear in the course of the following specification and claims, illustrative forms of the execution of the invention have been set forth on the accompanying drawings, in which:

Fig. 3 is a view similar to Fig. 2 of a modified form of the reserve tank and its connections.

Fig. 4 is a similar view of a further modified form of the reserve tank and its connections.

Figure 2:
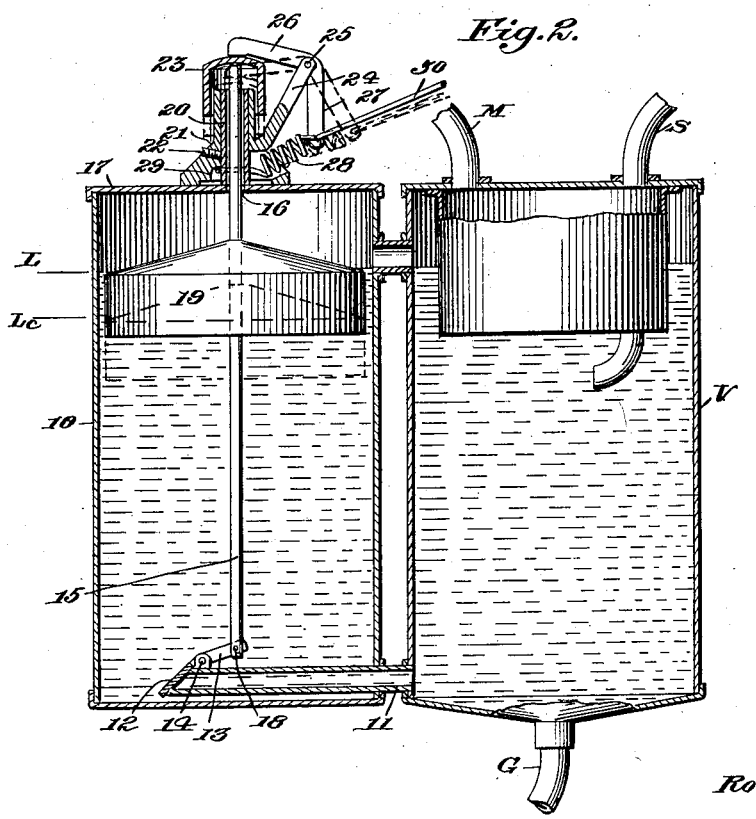
Fig. 2 is a vertical section through a vacuum tank and a reserve tank according to the present invention, being substantially an enlarged view of these portions of Fig. 1.

The invention has been shown as applied, by way of illustration but not of limitation, to a fuel supply system for an automobile including a vacuum tank. According to the present invention, the vacuum or normal supply tank V is connected as usual by a fuel supply pipe S to the main tank T of the automobile, and is provided with the suction pipe M connected to the engine manifold to establish the vacuum within the tank V which draws the fuel through the gasoline pipe S. The tank V may be of any known type, and as conventionally represented in Fig. 2, comprises an upper and a lower compartment separated by a partition wall. The lower compartment receives the gasoline under substantially atmospheric pressure so that it may drain through a pipe G to the carburetor C of the engine. All of this is old and well known and has only been represented diagrammatically.

According to the present invention, the auxiliary or emergency tank 10 is mounted with its bottom substantially at the level of the bottom of the vacuum tank V, and is of a sufficient height so that the normal maximum working level L of the liquid may be maintained both in the vacuum tank V and the auxiliary tank 10. A conduit 11 leads from the bottom of the vacuum tank V and opens at its other end into the auxiliary tank 10 near the bottom of the latter. A valve 12 is provided to close this end of the conduit 11, the valve being mounted on a lever 13 mounted by a pivot 14 at the bottom of the auxiliary tank 10. A rod 15 extends upwardly within the auxiliary tank 10 and passes out through an aperture 16 in the cover 17 thereof. At its lower end this rod 15 is connected by a pivot 18 to the lever 13; while adjacent the maximum fuel level L referred to above, a float 19 is fixedly mounted on the rod 15.

The cover 17 tightly fits the upper end of the auxiliary tank 10 to prevent the splashing of gasoline over the upper edge thereof. The end of the rod 15 which projects above the cover 17 passes through a sleeve 20 fixedly mounted on this cover. A bushing 21 is adapted to be slid onto the sleeve 20 and to be secured rigidly thereto in any angular desired position with respect to the axis of the rod 15 by a set screw 22. A closing cup 23 is mounted to slide freely on the reduced upper end of the bushing 21 to close the end of the sleeve 20, and is preferably independent of the rod 15, except that the rod during its upward movement will raise the cup 23. The bushing 21 likewise carries a bracket 24 having a pivot 25 thereon and a crank lever having a horizontal arm 26 and a vertical arm 27. The horizontal arm 27 projects over the cup 23 and prevents the withdrawal of the latter from the reduced end of the bushing 21 by the engagement of the horizontal arm 27 with the structure of the bracket 24, as shown in dotted lines in Fig. 2. Connected to the lower end of the vertical arm 27 is a coil spring 28 which has a large loop at its other end and extends through a cavity 29 of the bushing 21 and is engaged around the sleeve 20, so that it normally tends to rock the crank arm 26, 27 into the position shown in full lines.

Figure 1:
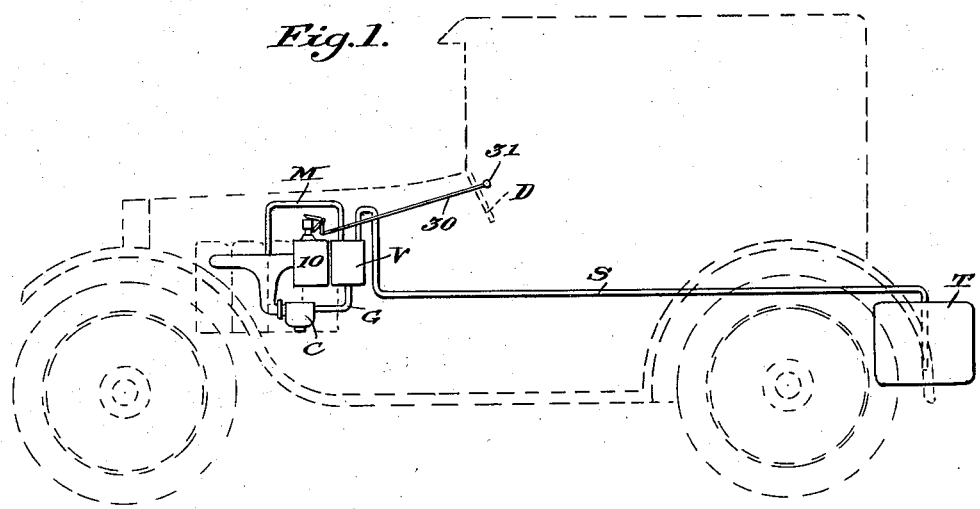
Figure 1 is a diagrammatic view showing a fuel feeding system of an automobile and including the reserve tank of the present invention.

A tension member, such as a cord or chain 30, is likewise connected to the lower end of the crank arm 27 and passes through the dashboard D of the vehicle (Fig. 1), and carries a button 31 for easy access by the driver.

The method of operation of this device is as follows: While the engine is running, the partial vacuum in the intake manifold spreads through the pipe M to cause the upper compartment of the vacuum tank V to aspirate gasoline through the liquid suction line S, and from time to time to deliver this gasoline into the lower compartment of the vacuum tank V, from which it flows by the gravity line G to the carburetor C. As liquid collects in the lower vacuum tank compartment, part of it may flow through the conduit 11 into the auxiliary tank 10. When this tank is empty, the float 19 drops to the position as indicated by dotted lines in Fig. 2, and the valve 12 is opened by the weight of the float and rod. If the lower compartment of the vacuum tank V fills to the level L, the rising level of gasoline in the auxiliary tank 10 finally raises the float from the position of dotted lines to the position of full lines in Fig. 2, thus closing the valve 12. It is preferred that this valve should be closed slightly before the level L is attained, for example, at a time when the liquid level is at Lc, being substantially half way on the skirt of the float 19. The gasoline continuing to rise in the lower compartment of the vacuum tank V will pass by an overflow opening 32 into the upper part of the auxiliary tank 10 to complete the filling to the level L, or even above this. In either event, the float remains raised by its buoyancy in the liquid fuel, and as the level in the lower compartment of the tank V subsequently drops, any excess liquid may drain off, but the valve 12 will remain closed.

During the raising of the rod 15 by the float 19, the upper end of this rod has raised the cap 23 to its limit, thus giving an outward visible indication of the fact that the auxiliary tank is full and ready for emergency use. If at any time it is desired to withdraw the emergency supply to the carburetor, the button 31 is pulled, and by its traction on the cord 30, the crank lever 27, 26 is rocked and the cup 23 and therewith the rod 15 are forced downward, thus submerging the float 19 momentarily. The reserve supply of fuel in the auxiliary tank 10 may now pass the valve 12 and flow through the conduit 11 to the discharge line G.

It will be observed that the float 19 is of substantially the same cross-sectional area on a horizontal plane as the auxiliary tank 10, so that very little liquid is required to fill the space between the float and the tank. At any time, therefore, that the rod 15 is forced downward when the liquid supply in the tank V is below the level L, it is apparent that liquid will immediately flow through the conduit 11 by reason of the greater head in the auxiliary tank 10, and that this momentary flow will be sufficient to reduce the liquid level in the auxiliary tank 10 from the level L to below the level Lc, so that the float is no longer suspended in its full line position by the buoyancy of the liquid, but falls of its own weight and maintains the valve 12 open. In other words, a momentary drag on the cord 30 prepares the valve 12 for the delivery of the entire contents of the auxiliary tank 10: while subsequently the spring 28 will return the cord 30 and the crank lever 26, 27 to its former position, so that when the lower compartment of the vacuum tank V is again filled, the float 19 will close the valve 12 as before, and thereafter maintain it closed until the float is again submerged, as set forth above. It is therefore apparent that the reserve system automatically refills and resets itself.

In the modified form of Fig. 3, the vacuum tank V is the same as before, and the auxiliary tank 40 is provided as before with a rod 45 and a float 49 fastened to the latter. The float 49 again is of substantially the same horizontal cross sectional area as the tank 40. In this modified form the conduit 41 is branched from the discharge line G leading to the carburetor, and has an opening to the interior of the auxiliary tank 40 which is closable by a beveled valve member 42 mounted on the end of a lever 43 carried by a pivot 44 on the bottom of the auxiliary tank 40, this lever being associated by a pivot 48 with the rod 45. The upper end of the rod 45 is guided as before in a bushing 50 mounted on the cover 47 of the auxiliary tank 40, and means may be provided as before to depress the rod 45 and therewith the float 49 to withdraw the emergency fuel supply.

In this modified form the conduit 41 is continued by a line 41$^a$ and an upwardly extending pipe 32$^a$, whose upper orifice communicates with the auxiliary tank 40 at substantially the predetermined maximum level L for the vacuum tank V. The operation of this device is substantially the same as before. As the lower compartment of vacuum tank V fills, gasoline flows past the open valve 42 into the auxiliary tank 40 until a level Lc is reached at which the float 49 is raised to close the valve 42. If the liquid in the lower compartment of the vacuum tank B attains the level L, further fuel may flow through the conduits 41, 41$^a$, 32$^a$ into the auxiliary tank 40 to complete its filling to the level L, or even above. As the liquid level in the tank V drops toward or beyond the level L, the excess liquid is withdrawn from the auxiliary tank 40 by the overflow pipe 32, but the main reserve is held by the valve 42, so that the liquid level never falls below the level L unless the valve 42 is open, as set forth above.

In the form of construction of Fig. 4, the main supply tank V is connected by a conduit 61 with a sleeve 62 extending upwardly through the floor of the auxiliary tank 60 for a distance greater than the maximum permissive travel of a hollow tube 63 which is rigidly connected with the float 64, which again is substantially of the same horizontal area as the cross-section of the tank 60. The hollow tube 63 is thus guided in the sleeve 62 in its vertical movements. Adjacent the floor of the auxiliary tank 60 the sleeve 62 is provided with an opening 62$^a$ into alinement with which is adapted to come an opening 63$^a$ of the hollow sleeve 63 when the float 64 and the sleeve 63 are in the lower position. The hollow tube 63 is likewise provided with apertures 63$^b$ above the level of the float 64. It will be understood that the means for delivering gasoline to the vacuum tank V and draining it therefrom through a conduit G may be of any desired type, and that the operating system of Figs. 1 and 2, and including the tube 63 or the like for depressing the float below the level of liquid, may be employed.

In operation, the form of execution shown in Fig. 4 receives gasoline through the conduit 61 as the vacuum tank V fills. This gasoline flows through the apertures 63$^a$, 62$^a$ into the bottom of the auxiliary tank 60 until the level of liquid in this tank has risen to such a point that the float 64 is raised, thus closing the valve by bringing the openings 63$^a$, 62$^a$ out of alinement. During the rise of liquid in the auxiliary tank 60, the equivalent level has been maintained in the hollow tube 63. When the valve 63$^a$, 62$^a$ closes, the liquid may continue to rise in hollow tube 63, and finally overflow through the opening 63$^b$, and thus fill the tank 60 to the determined level. It will be understood that the level of the opening 63$^b$ may be the normal operating level of the vacuum tank V, and when the vacuum tank V falls below such level, the excess liquid in the auxiliary tank 60 will drain back through the opening 63$^b$, tube 63 and conduit 61 to the discharge conduit G.

In each form of execution it will be noted that a momentary submersion of the float below its closing position will momentarily open the valve and permit a sufficient flow of liquid by reason of the cross-section of passage through the valve and the associated conduits, so that the quantity of liquid existing between the maximum reserve level and the level at which the float begins to be sustained by the liquid in the auxiliary tank will instantly flow out, so that if the traction of the cord 30 be discontinued, the float can no longer be raised by the liquid remaining in the tank, and hence the liquid remaining in the auxiliary tank will continue to flow out through the conduits and pass by pipe G to the carburetor. In each case, also, the rise of liquid in the auxiliary tank as the main tank V is filled will finally cause a raising of the float and closure of the valve, after which a further quantity of liquid is delivered into the auxiliary tank to maintain the valve positively closed by, so to speak, an "excess buoyancy"; and yet when the main tank falls below a predetermined level, the overflow system of the auxiliary tank will immediately determine a minimum level prior to discharge below which the auxiliary system will not drain, but will maintain its liquid as a reserve or emergency supply.

In each form of construction it will be noted that after the liquid fuel rises in the auxiliary tank 40, the air may escape therefrom through the aperture 16 and the sleeve 20 and finally downwardly between the cup 23 and the bushing 21; and as the fuel flows out of the auxiliary tank in each instance, air may follow it in an inverse manner.

It will be understood that the invention is not limited to the modification shown, but may be employed in many ways within the scope of the appended claims.

What I claim as new and desire to secure by Letters Patent is:

1. In a liquid fuel supply system for an internal combustion engine, an emergency fuel supply tank, a conduit through which the liquid in said emergency tank may flow to the engine carburetor, normal fuel supply means connected to said conduit so that liquid fuel may pass through the conduit to fill the emergency tank during normal operation, a closing valve on said conduit, a float in said emergency tank, a vertically movable rod rigidly connected to said float and attached to said valve to close the same when the float is raised to a predetermined level by the liquid in said emergency tank, and a further conduit from said normal fuel supply means opening into said emergency tank at a point above said predetermined level to admit further liquid fuel into said emergency tank after said valve is closed whereby to maintain an excess buoyancy of said float over that required to close the valve.

2. In a liquid fuel supply system as in claim 1, in which means are provided to lower said float momentarily to open the valve and the float is of substantially the same cross-sectional area as the emergency tank, so that the small quantity of liquid around the float may be discharged through the opened valve upon such momentary lowering when the normal supply fails whereby the float can no longer be raised by the liquid to close the valve.

3. In a liquid fuel supply system for an internal combustion engine, a first or normal fuel tank and a discharge conduit therefrom to the carburetor of said engine, an auxiliary or emergency fuel tank, a conduit having a valve and connecting said tanks so that the liquid fuel in said tanks can establish a common level while said valve is opened, a float in said emergency tank, means rigidly connected to said float to move therewith and attached to said valve to close the same when the float is raised to a predetermined level by the liquid in said emergency tank, and a further conduit connecting said tanks above said predetermined level to establish a maximum level of liquid in said emergency tank whereby to admit further liquid fuel into said emergency tank above said predetermined level to maintain said valve closed by an excess buoyancy of said float.

4. In a liquid fuel supply system as in claim 3, in which means are provided to lower said float momentarily to open the valve and the float is of substantially the same cross-sectional area as the emergency tank, so that the small quantity of liquid around the float may be discharged through the opened valve upon such momentary lowering when the normal supply fails whereby the float can no longer be raised by the liquid to close the valve.

In testimony whereof, I affix my signature.

ROBERT H. GILLESPIE.